United States Patent [19]

Degen et al.

[11] Patent Number: 5,230,592
[45] Date of Patent: Jul. 27, 1993

[54] DRILL JIG FOR PRODUCING PREDETERMINED DRILL HOLE PATTERNS IN WORKPIECES

[75] Inventors: Klemens Degen, Weibern; Hans-Juergen Schueller, Koenigsfeld, both of Fed. Rep. of Germany

[73] Assignee: Werkzeug GmbH, Fed. Rep. of Germany

[21] Appl. No.: 894,750

[22] Filed: Jun. 5, 1992

[30] Foreign Application Priority Data

Jun. 8, 1991 [DE] Fed. Rep. of Germany ....... 4118991

[51] Int. Cl.⁵ .................................................. B23B 47/28
[52] U.S. Cl. .............................. 408/115 R; 408/241 B
[58] Field of Search ............... 408/72 B, 88, 97, 103, 408/108, 115 R, 115 B, 241 G, 241 B

[56] References Cited

U.S. PATENT DOCUMENTS

| | | |
|---|---|---|
| 2,838,966 | 6/1958 | Campbell . |
| 3,465,620 | 9/1969 | Hilburn ............................ 408/115 R |
| 3,775,857 | 12/1973 | Handy ............................. 408/115 R |
| 3,807,889 | 4/1974 | Kiezel . |
| 5,056,966 | 10/1991 | Lee ................................. 408/115 R |
| 5,154,548 | 10/1992 | Walsh .............................. 408/115 R |

FOREIGN PATENT DOCUMENTS

| | | |
|---|---|---|
| 311028 | 4/1971 | Austria . |
| 50210 | 4/1982 | European Pat. Off. . |
| 591291 | 1/1934 | Fed. Rep. of Germany . |
| 2142164 | 8/1971 | Fed. Rep. of Germany . |
| 837601 | 6/1981 | U.S.S.R. . |

*Primary Examiner*—Daniel W. Howell
*Attorney, Agent, or Firm*—Antonelli, Terry, Stout & Kraus

[57] ABSTRACT

A drill jig for producing drill hole patterns in workpieces which include a hole index rail, with at least one annular stop being adjustable transversely to a series of holes in the hole index rail. At least one lateral stop is adjustable along the hole index rail, with a slide carrying a drill bush adapted to be aligned with respect to one of the holes of the hole index rail. The slide and the at least one lateral stop are displaceably guided along the hole index rail, with the lateral stop including an elongated stop section adjustable in a stepwise manner at a lateral stop carrier in a longitudinal direction of the hole index rail. The lateral stop carrier includes a locking member.

11 Claims, 8 Drawing Sheets

DRILL JIG FOR PRODUCING PREDETERMINED DRILL HOLE PATTERNS IN WORKPIECES

BACKGROUND OF THE INVENTION

The present invention relates to a drill jig for producing a predetermined series of drilled hole patterns in workpieces, such as, for example, boards to be joined by dowels or cabinets or shelf walls to be provided with rows of holes, with a hole index rail being placed on the workpiece to be machined and including a series of equidistant holes, with at least one angular stop, adjustable transversely to the series of holes, for setting a distance of the series of holes from an edge of the workpiece, and with at least one lateral stop adjustable along the hole index rail.

Drill jigs have been proposed for either forming drilled hole patterns for boards to be connected by dowels, or for the production of parallel rows of holes in a cabinet or shelf wall; however, the proposed drill jigs cannot be utilized or, if utilized, may be only utilized in a cumbersome fashion, for other types of applications.

Moreover, the proposed drill jigs are fixed at a specific drilled hole diameter so that a craftsman or a do-it-yourselfer must obtain different drill jigs for the various drilled hole diameters required under practical conditions.

SUMMARY OF THE INVENTION

The aim underlying the present invention essentially resides in providing a maximally universally useable drill jig which is simply to manipulate and is inexpensive to manufacture.

With a drill jig of the aforementioned type, in accordance with the present invention, a slide, carrying a drill bush adapted to be aligned with the respective holes of the hole index rail, is displaceably guided along the hole index rail, and a lateral stop is provided, with the slide and the lateral stop being, in each case, associated with the locking member engaging into a hole of the hole index rail. The lateral stop includes an elongated stop section adjustable in a stepwise manner at a lateral stop carrier in the longitudinal direction of the hole index rail, and the lateral stop carrier includes the locking member.

A number of advantages are achieved by the invention. More particularly, since the drill bush is displaceable along the hole index rail by the slide, the drill jig requires only a single drill bush to be moved to the respectively utilized hole of the hole index rail where the drill bush is, in each case, exactly positioned by the locking member which engages into another hole of the hole index rail. The lateral stop, constructed as a bipartite element of a stop section and lateral stop carrier, is also displaceable along the rail and can be roughly locked in place at each hole of the hole index rail by the locking member arranged at the lateral stop carrier, whereupon the elongated stop section can execute a stepwise precision adjustment. This precision adjustment is retained when transferring the lateral stop from one hole to the other. The thus effected fine adjustment, readable off a scale of the lateral stop carrier, can be preset without any effort in transferring the lateral stop from one end of the hole index rail to the other end of the hole index rail, namely, in all cases, the stop end of the stop section points toward a center of the hole index rail. By virtue of this construction, an aligned series of holes in two boards to be joined by doweling can be formed since, in this case, the spacings of the drilled holes from the board edges to be placed in contact with each other can be maintained without any problems in both boards, even if the series of holes does not lie exactly centrally in the board to be drilled at the end face.

Preferably, two lateral stops are associated with the drill jig. Once a lateral stop has been finely adjusted in correspondence with a desired marginal distance of the series of holes, the other lateral stop can be subjected, in advance, to fine adjustment in the same manner so that the drill jig can be completely adapted to a specific utilization.

In accordance with further features of the present invention, the slide can be associated with a set of exchangeable drill bushes having differing internal diameters. Thus, the drill jig can also be used for different drilled hole diameters, with it being merely necessary to select the respectively fitting drill bush for this purpose.

The hole index rail advantageously includes a flat profile member, for example, an extruded aluminum profile provided, on main sides thereof, with C-shaped grooves for guiding the slide and the lateral stops. One or two angular stops can also be simultaneously guided on the guide groove for the lateral stops.

The drill jig of the present invention can be manufactured in an economical fashion, can be used for a variety of different applications, and can, in each application or utilization, be easily manipulated.

In accordance with the present invention, a plurality of exchangeable drill bushes of differing internal diameters may be associated with the slide, and the drill jig may include at least two lateral stop carriers having stop sections adapted to be adjusted in a stepwise manner.

Furthermore, the drill jig of the present invention may include an angle section carrier which is longitudinally displaceably guided along the hole index rail, with an angle section being adjustable at the angle section carrier in an infinitely variable fashion transversely to the series of holes.

According to the present invention, the hole index rail of the drill jig of the present invention may include a flat profile member having a substantially C-shaped groove opening toward a top or upper side of the hole index rail for guiding the slide, with a further substantially C-shaped groove opening toward an underside of the hole index rail for guiding the lateral stop carrier and the angular stop carrier. The series of holes and the further substantially C-shaped groove is arranged offset with respect to the series of holes.

The locking member of the drill jig of the present invention may include, for example, a peg and a spring for biasing the peg so as to enable the peg to be unlocked by a handle.

The drill bush or bushes subtend the slide with a base and carry, on an external thread located there above, a nut for fixedly clamping the slide to marginal legs of the substantially C-shaped groove of the profile member.

The at least one lateral stop carrier, in accordance with the present invention, is adapted to clamped by a screw knob onto marginal legs of the substantially C-shaped groove and includes a transverse leg projecting beyond the series of holes. The locking member may be in the form of a cylindrical projection arranged on the main surface of the transverse leg facing the hole index rail, with the oppositely located main surface of the transverse leg carrying a guide groove for the stop section.

The drill jig of the present invention may include a locking projection arranged at the guide groove, with holes for fixedly determining discrete lateral stop positions being arranged at the stop section. The stop section may be separately fixedly clamped to the lateral stop carrier by a screw knob penetrating a slotted hole of the stop section.

The angular stop of the drill rig of the present invention may, for example, include an angle section, with a leg of the angle section, in contact with the hole index rail, being provided with two parallel slotted holes extending transversely to the series of holes. One of the slotted holes may be penetrated by a screw knob for clamping the angle section to the angle section carrier and the other of the slotted holes may be penetrated by a screw knob for clamping the angular stop to the marginal legs of the stop carrier groove of the whole index rail.

In accordance with the present invention, a drill jig is provided for producing specific drilled hole patterns in workpieces, for example, in boards to be joined by dowels or in a cabinet or shelf walls to be provided with rows of holes, with a hole index rail to be placed on the workpiece to be machined and including a series of equidistant holes, and with at least one angular stop, adjustable transversely to the series of holes, for setting the distance of the series of holes from an edge of the workpiece, and with at least one lateral stop adjustable along the hole index rail. A slide, carrying a drill bush can be respectively aligned with one of the holes in the hole index rail and the lateral stop are guided along the hole index rail. The slide and the lateral stop are, in each case, associated with a locking member engaging into a hole of the hole index rail. The lateral stop includes a stop section adjustable in a stepwise manner at a lateral stop carrier in the longitudinal direction of the hole index rail. The lateral stop carrier includes a locking member, and the drill jig includes two identical lateral stop carriers with stop sections adjustable in a stepwise fashion. The hole index rail is fashioned as a flat profile member having a substantially C-shaped groove open toward a top side of the hole index rail for guiding the slide and a further substantially C-shaped groove opening toward an underside of the hole index rail for guiding the lateral and angular stop carriers. The series of holes are formed in the bottom of the C-shaped groove for guiding the slide, and the further C-shaped groove is arranged offset beside or adjacent the series of holes.

BRIEF DESCRIPTION OF THE DRAWINGS

The above and other objects, features, and advantages of the present invention will become more apparent from the following description when taken in connection with the accompanying drawings which show, for the purposes of illustration only, several embodiments in accordance with the present invention and wherein.

DETAILED DESCRIPTION

Figure 1:
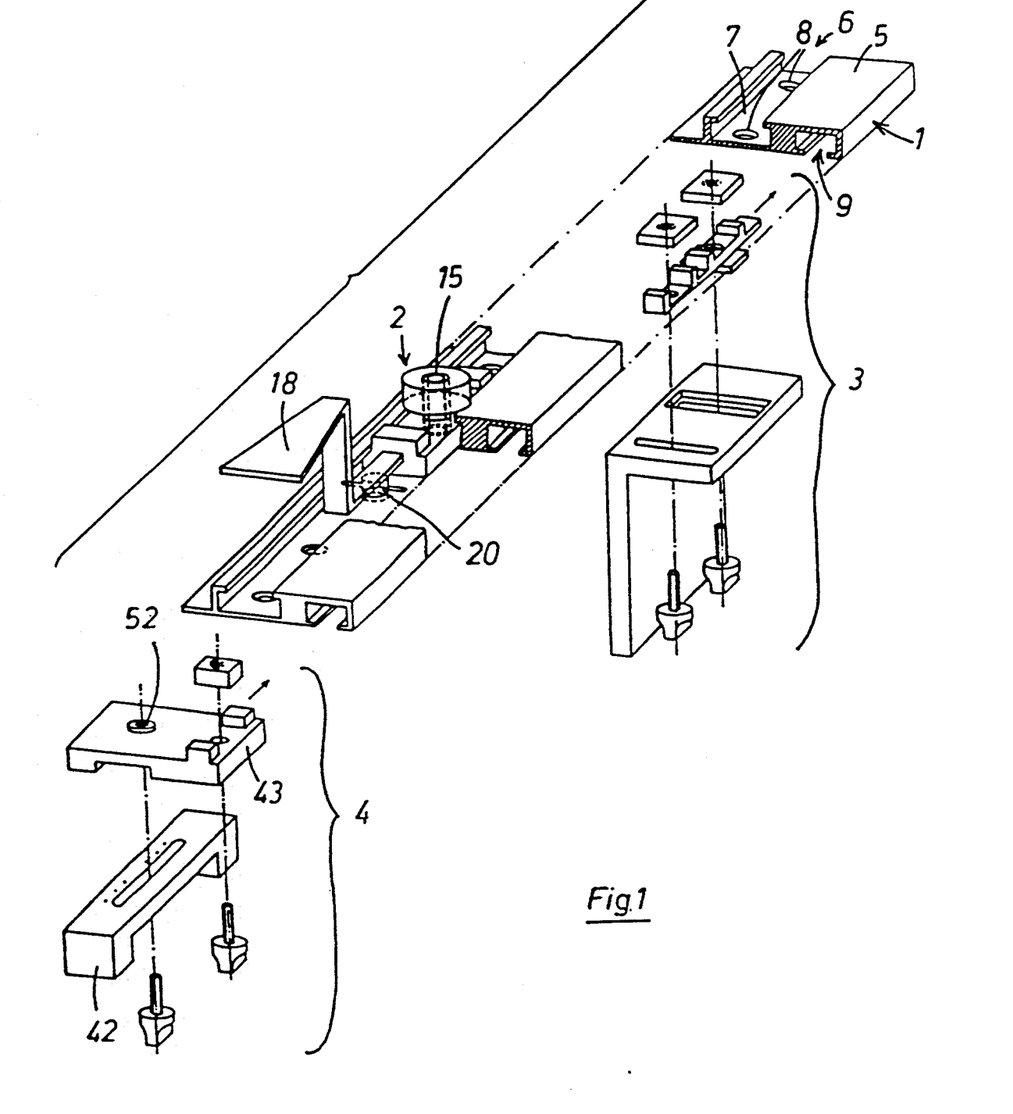
FIG. 1 is an exploded perspective view of a drill jig according to the present invention.

Referring now to the drawings wherein like reference numerals are used throughout the various views to designate like parts and, more particularly, to FIG. 1, according to this FIGURE, a drill jig, constructed in accordance with the present invention, includes a hole index rail 1, a drill bush slide 2 displaceable guided on a top side of the hole index rail 1, an angular stop 3 and a lateral stop 4, with the angular stop 3 and the lateral stop 4 being displaceable along an underside of the hole index rail 1. Normally, the drill jig is associated with two identical angular stops 3 and two identical lateral stops 4 as shown, for example, in FIG. 8.

The hole index rail 1 includes a flat profile member, preferably fashioned as an extruded aluminum profile member having a substantially C-shaped guide groove 6, open toward a top side 5 for accommodating a portion of the slide 2. A bottom 7 of the substantially C-shaped groove 6 includes a series of equidistant holes which, preferably, have a central spacing of 32mm. On an underside of the hole index rail 1, which is adapted to be placed upon the workpiece, the hole index rail 1 includes, offset beside or adjacent the groove 6, a further substantially C-shaped groove 9 opening toward the bottom and serving for guiding the angular stop 3 and the lateral stop 4.

Figure 2:
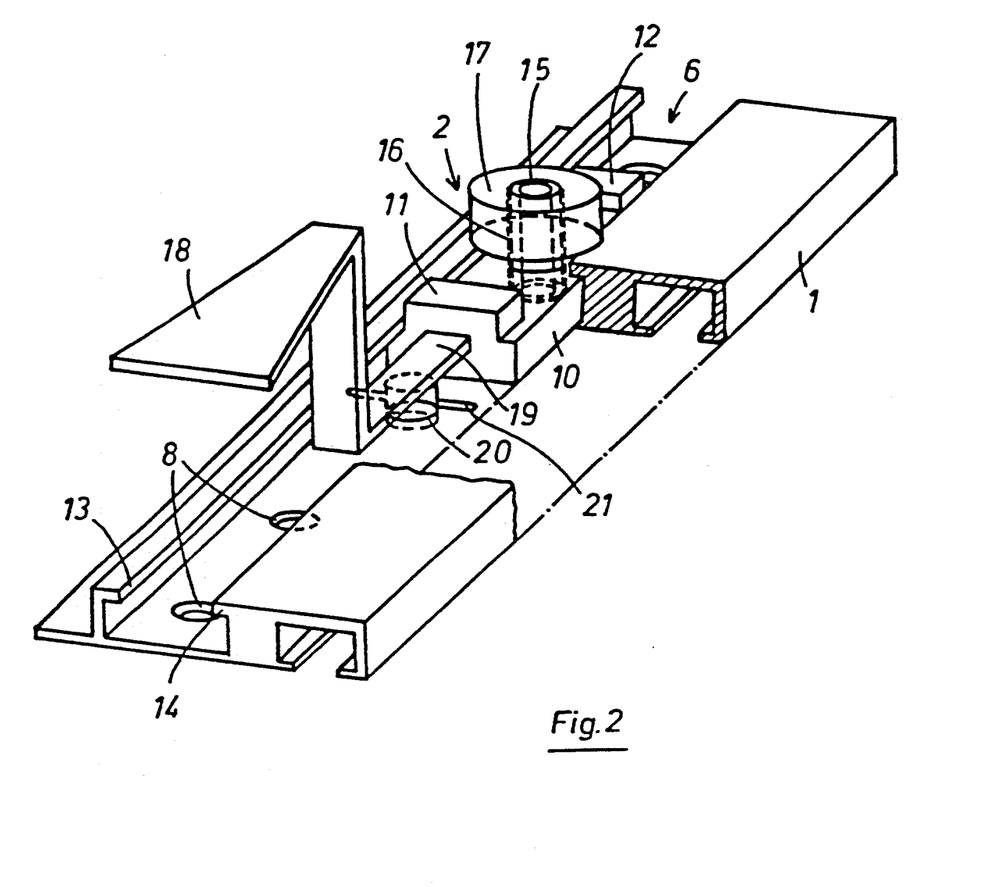
FIG. 2 is an enlarged perspective view of the drill bush slide of FIG. 1 inserted in a hole index rail.

The drill bush slide 2, as shown in FIG. 2, may include a synthetic resin and a flat guide member 10 adapted to be received by the groove 6 and provided at the end side with two extensions 11, 12 bordered by marginal legs 13, 14. The guide member 10 carries a drill bush 15 provided with an external thread 16 for receiving, for example, a knurled nut 17. The knurled nut 17 enables the slide to be fixedly clamped to the marginal legs 13, 14. A bent web 19, terminating in a handle 18, projects from one end face of the guide member 10. The bent web 19 may be elastically bent in an upward direction and carry, on an underside thereof, an integrally formed locking member 20 fashioned as a peg, fitting without play or clearance, into one of the holes 8. The peg may be removed by the handle 18 for enabling an adjusting of the slide 2. The center-to-center distance between the drill bush 15 and the locking member 20 is equal to one or more times a central distance between two neighboring holes 8 so that, during engagement of the locking member 20, the drill bush 15 is, in each case, exactly aligned with respect to a hole 8. The locking member 20 carriers, in the upper zone, a cross pin 21 subtending the marginal legs 13, 14 for limiting the lifting-out or removing motion.

Figure 3:
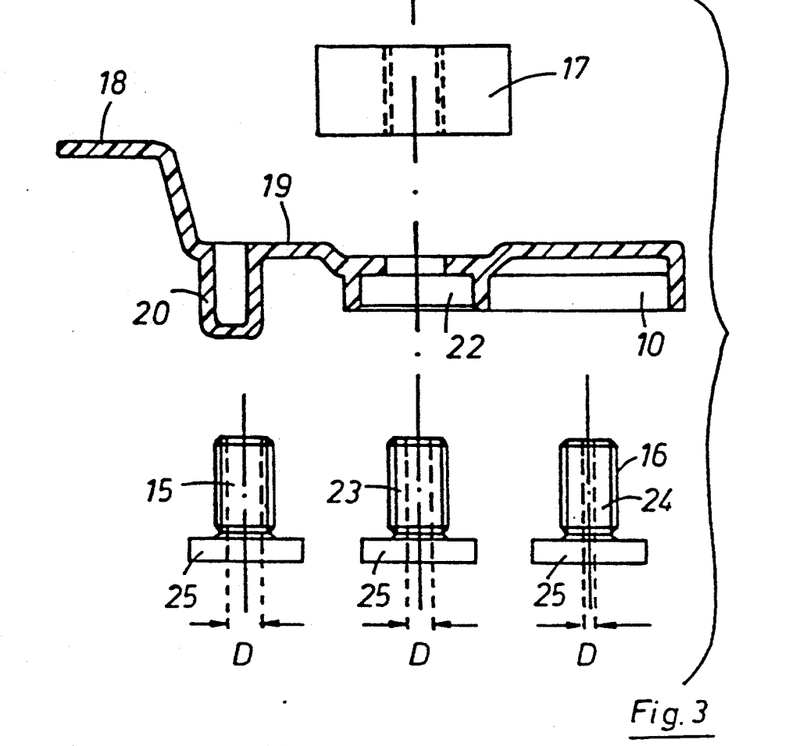
FIG. 3 is an exploded longitudinal sectional view of another embodiment of a drill bush slide constructed in accordance with the present invention together with a set of associated drill bushes and a clamping nut.

As shown in FIG. 3, the slide 2, the guide member 10, fashioned as an injection-molded part of a synthetic resin of uniform wall thickness, is provided with a stepped through bore 22 for accommodating the drill bush 15. A set of drill bushes 15, 23, 24 each having a different internal diameter D, is associated with the slide, with the drill bushes 15, 23, 24 respectively including a flange-like base 25 at the lower end, received in hidden fashion b a flaring portion of the through bore 22. All of the drill bushes 15, 23, 24 are provided with an identical external thread 16 for threadably receiving or accommodating the nut 17.

Figure 4:
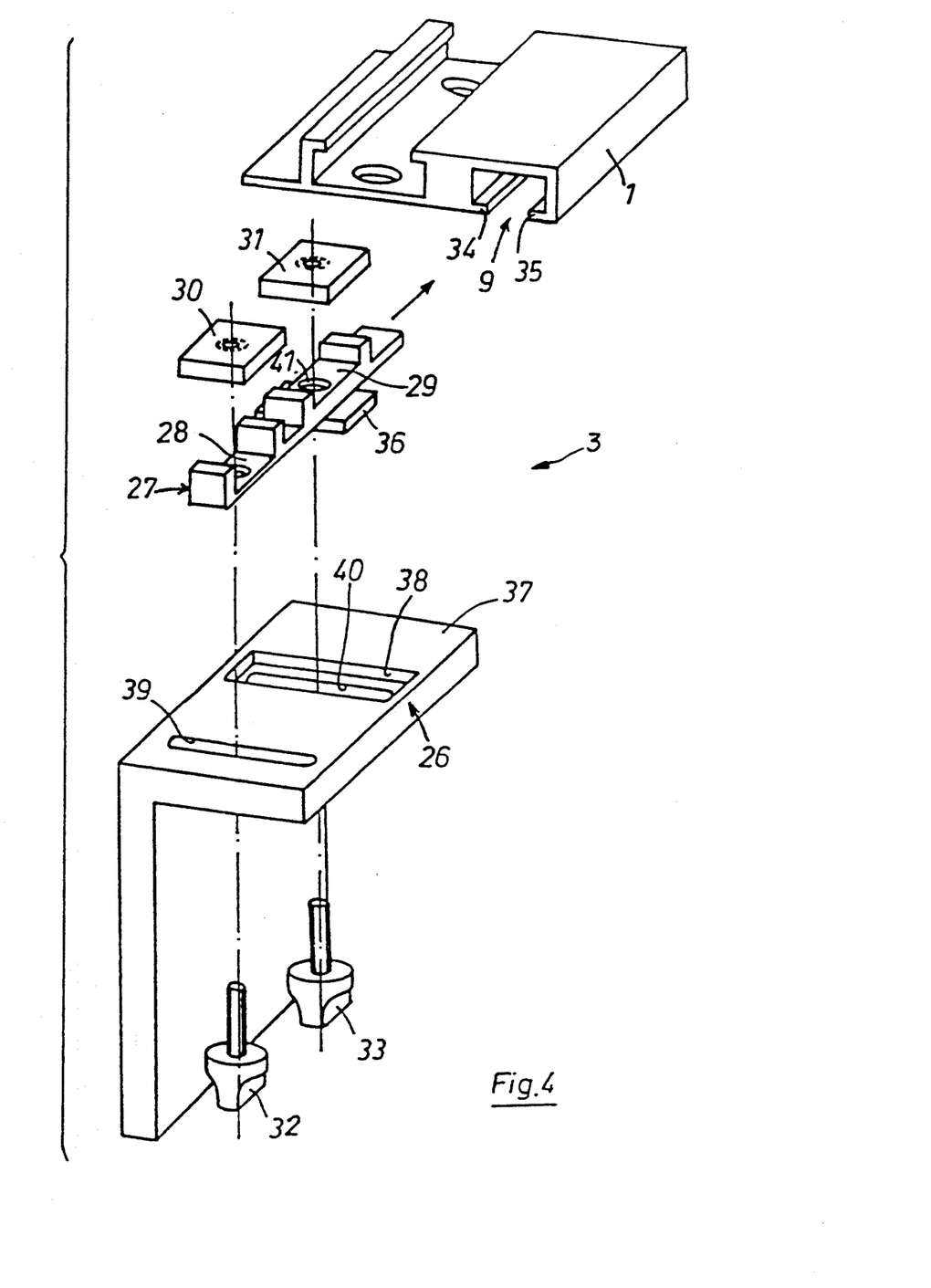
FIG. 4 is an exploded view, on an enlarged scale, of an angular stop of the drill jig in conjunction with a piece of the hole index rail.

The angular stop, as shown in FIG. 4, includes an elongated angle section 27, two rectangular nuts 30, 31 insertable in fitting holders 28, 29 of the carrier 27, and two associated screw knobs 32, 33. The carrier 27 may be inserted, together with the nuts 30, 31 in the groove 9, with the nuts, 30, 31 extending behind the marginal legs 34, 35 of the groove 9. A transverse strip 36 is integrally formed at an underside of a carrier 27 and is in contact with an underside of the hole index rail 1 when the carrier 27 is inserted. The transverse strip 36 is oriented or directed transversely to the hole index rail 1. The angel section 26 has, on its leg 37, adapted to be placed in contact with the hole index rail 1, a rectangular cut out 38 extending transversely to the hole index rail 1. The rectangular cut out 30 is considerably longer than the transverse strip 36 and receives the transverse strip 36 without play or clearance as a guide means during a transverse adjustment of the angle section 26. The leg 37 is provided with two parallel slotted holes 39, 40 oriented or directed transversely to the hole index rail 1, with the slotted hole 40 being arranged on the bottom of the cut out 38.

The screw knob 32 penetrates or extends through the slotted hole 39 in the leg 37 and a through hole in the carrier 27 and is threaded into the nut 30. By tightening the screw knob 32, the carrier 27 can be fixedly clamped, together with the angle section 26, on the hole index rail 1. For this purpose, a wall thickness of the carrier 27 is less in a zone of the holder 28 than a wall thickness of the marginal legs 34, 35. The screw knob 33 penetrates the slotted hole 40 in the leg 37 and a through hole 41 in the carrier 27 and is threaded into the rectangular nut 31.

In accordance with the invention, the through hole 41 is formed in a zone of the transverse strip 36 of the carrier 27. In the region of the holder 29, a wall thickness of the carrier is considerably larger than a wall thickness of the marginal legs 34, 35 so that only the angle section 26 is fixedly clamped to the carrier 27 by the screw knob 33. The locking of the angle section 26 in a desired stop position is effected while the screw knob 32 is still loose so that the angular stop 3 remains displaceable along the hole index rail 1 even after a transverse adjustment thereof.

Figure 5:
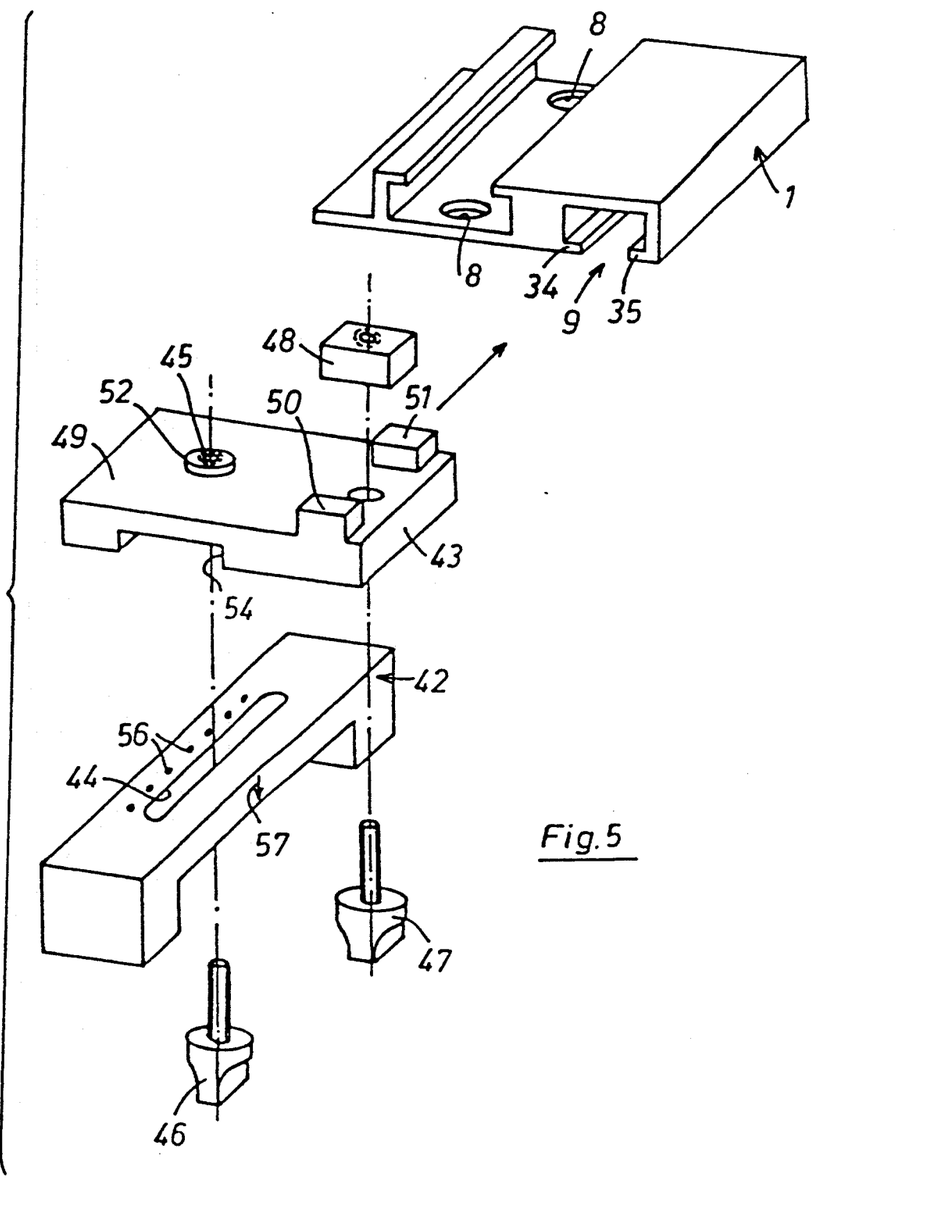
FIG. 5 is an exploded view, on an enlarged scale, of a lateral stop of the drill jig of the present invention in conjunction with a piece of the hole index rail.
Figure 6:
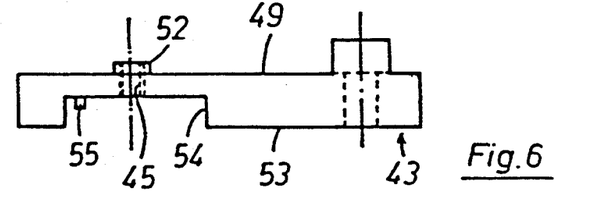
FIG. 6 is a lateral view of a lateral stop carrier according to FIG. 5.
Figure 7:
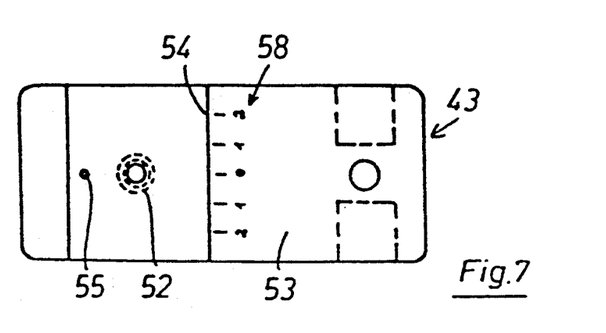
FIG. 7 is a bottom view of a lateral stop carrier of of FIG. 6.

The lateral stop 4, as shown, for example, in FIGS. 5, 6, and 7, includes an elongated stop section 42, a lateral stop carrier 43, a screw knob 46 penetrating a longitudinally oriented slotted hole 44 of the elongated stop section 42 and threaded into a thread 45 of the carrier 43, and a screw knob 47 only penetrating the carrier 43 and threaded into an associated rectangular nut 48. The carrier 43 includes, in a main surface 49 thereof, to be placed in contact with the other side of the hole index rail 1, two rectangular guide extensions 50, 51 introducible between the marginal legs 34, 35 for receiving the nut 48, wherein the nut 48, in turn, extends behind the marginal legs 34, 35. Furthermore, the carrier 43, projecting beyond the series of holes 8, is provided on the main surface 49 with a locking member 52 in the shape of a short, cylindrical peg fitting exactly into the holes 8 of the hole index rail 1. On the lower main surface 53, the carrier 43 is provided with a rectanglar guide groove 54, oriented or directed in a direction parallel to the hole index rail 1, for receiving the elongated stop section 42 which may, for example, be square. The carrier 43 further includes a pin-shaped projection 55 projecting into the guide groove 54, with the central axis of the pin-shaped projection 55 lying, with the central axis of the locking member 52, in the same transverse plane of the carrier 43, and a plurality of equidistant mounting holes 56 for the projection 55 is provided at the stop section 42.

The central hole is associated with a marking or index 57 (FIG. 5) at the stop section 42, while a scale 58 (FIG. 7) is arranged on the main surface 53 of the carrier 43, with the zero point of the scale 58 lying in the transverse plane containing the pin 55 and the locking member 52. The scale 58 is indexed in both directions with the zero point thereof being disposed centrally of the width of the main surface 53. Accordingly, the stop section 42 is adjustable relative to the stop carrier 43 and thus relative to a hole 8 of the hole index rail 1 in a stepwise fashion and can be finely adjusted and locked in place. The thus-effected fine adjustment can be immediately read off from the scale 58.

Figure 8:
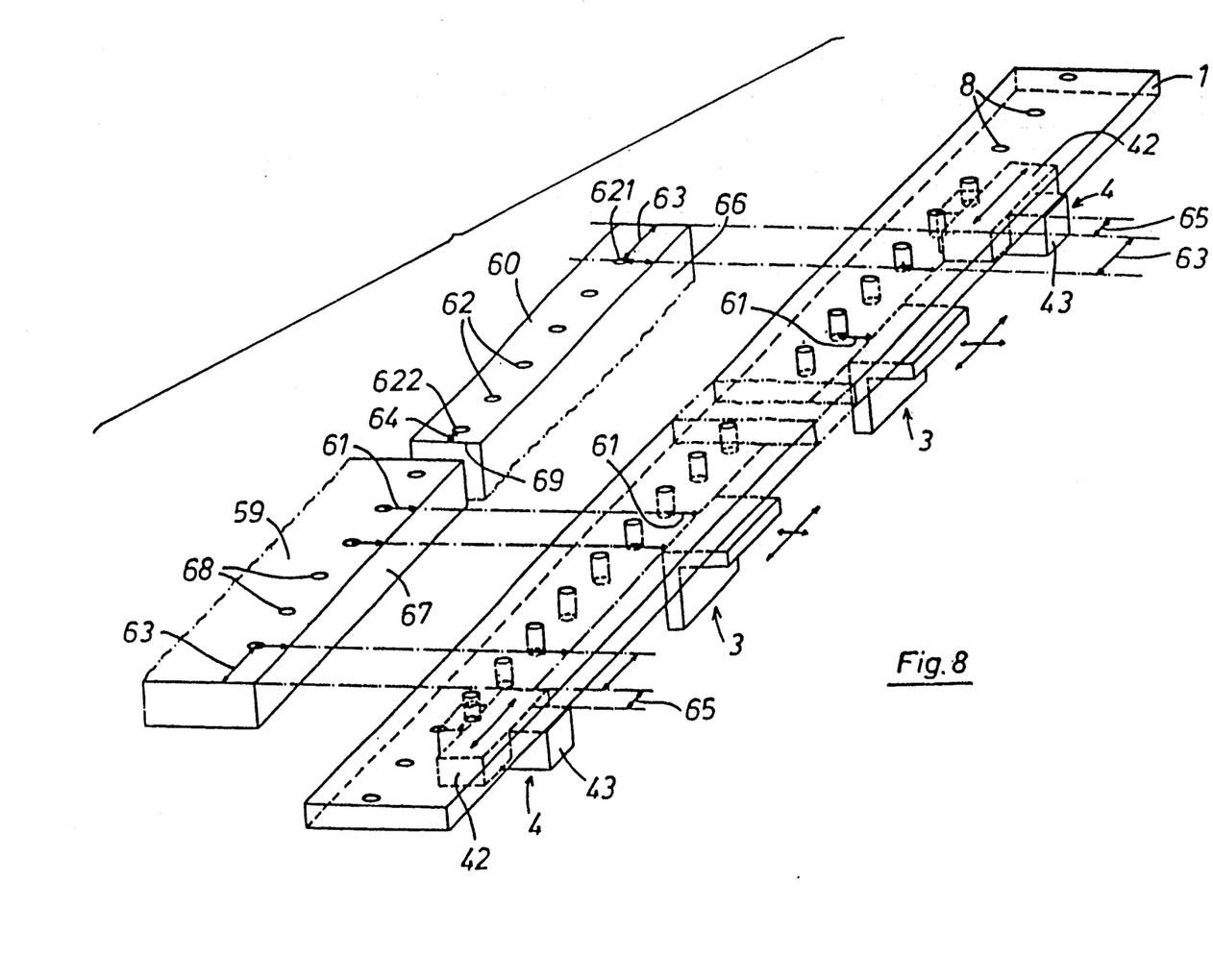
FIG. 8 is a schematic perspective exploded view illustrating a manipulation of the drill jig of the present invention when applied to bores to be joined by dowels.

FIG. 8 illustrates a manipulation of the drill jig of the present invention during a production of a corner dowel connection between two wooden boards 59, 60. First, the two angular stops 3 are set at their desired transverse spacing or distance 61 with respect to the series of holes 8 in such a manner that the drill holes 62, to be formed at the end face in the wooden board 60 to be drilled, are substantially positioned in the longitudinal center. Then, the lateral stop 4, that is at the top of FIG. 8, is adjusted by initially clamping the carrier 43 in place with alignment to one of the holes 8 and, thereafter, the stop section 42 is adjusted in discrete steps to such a position that the drilled holes 621 and 622, to be formed at the rib, are provided with adequate marginal spacings 63, 64. The thus-effected fine adjustment of the stop section 42 is read off from the scale 58 of the lateral stop 4, and at the other lateral stop 4, mounted in FIG. 8 at the lower end of the hole index rail 1, the stop section 42 is adjusted into an identical position but, in this case, the stop section 42 projects in the opposite direction but by the same distance 65, beyond the carrier 43 so that the same marginal spacings 63, 64 result in the board 59 to be drilled on the flat side with identical board widths. The board 60 is then provided with drilled holes 62 with a main surface 66 of the board being in contact with the angular stop 3, and with the lateral stop 4 being utilized which is at the top of FIG. 8. Subsequently, the board 59 is placed in contact with the angular stops 3 with its end face 67 being in alignment with the main surface 66 of the board 60 in the finished corner joint, and the lateral stop that is at the bottom of FIG. 8 is utilized so that the drilled holes 62, 68 are, in each case, formed with an identical hole pattern but in a nearer-inversion relationship with respect to the marginal spacings 63, 64. After tilting the board 60 and 180° about its marginal edge 69, the drilled hole patterns are also aligned with respect to their marginal spacings, namely, independently of the fact as to whether or not the drilled holes 62 and the board 60 to be drilled on the end face thereof lie exactly in the longitudinal center.

Figure 9:
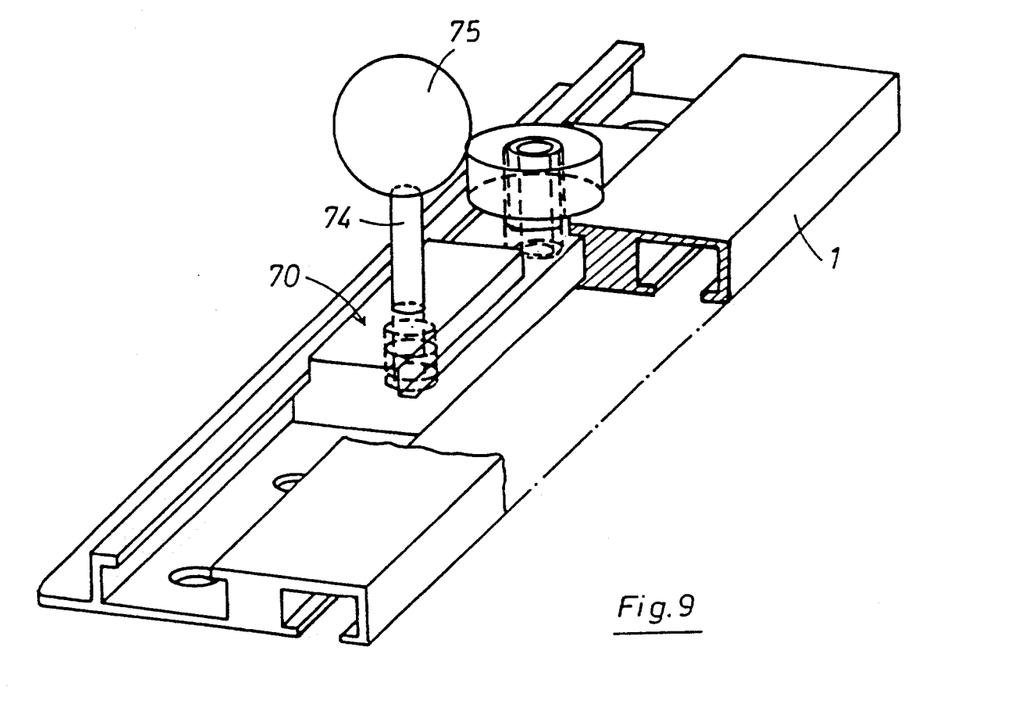
FIG. 9 is a perspective view of a further embodiment of a drill bush slide inserted in the hole index rail.
Figure 10:
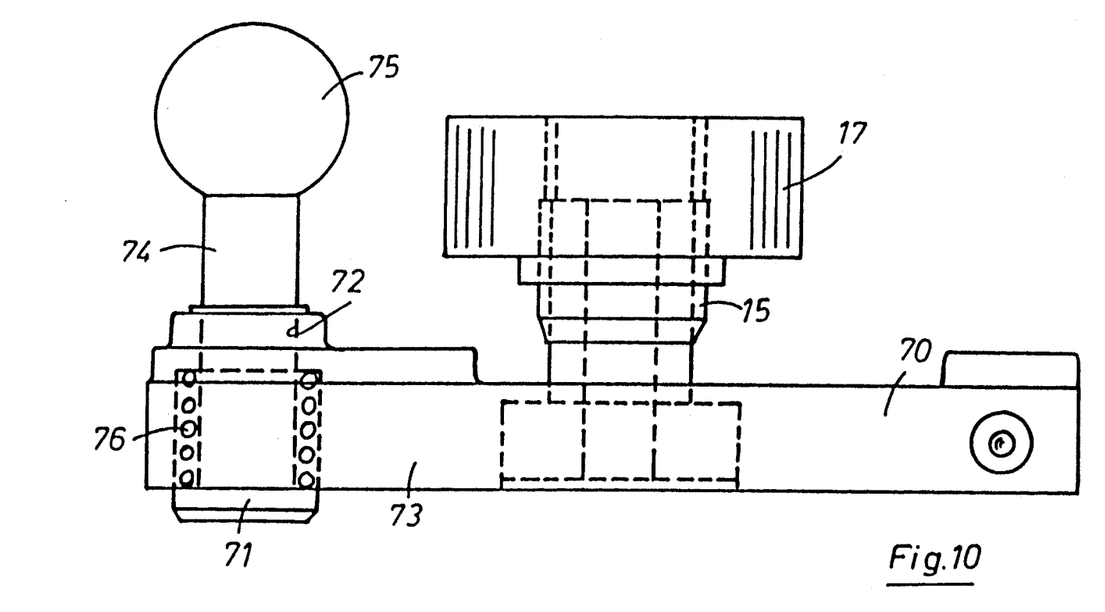
FIG. 10 is a side view of the drill bush slide of FIG. 9.

FIGS. 9 and 10 illustrate another embodiment of a drill bush slide 70, wherein a locking member 71 is provided which includes a base of a bolt 74 penetrating a stepped bore 72 of the guide member 73, with the bolt 74 being provided with a spherical handle 75 at an upper end thereof. A compression spring 76 is clamped in place between an annular shoulder of the stepped bore 72 and an annular shoulder of the bolt 74, with the compression spring 76 retaining the locking member 71 in engagement with a hole 8. The locking member 71 may be manually retracted against a bias of the compression spring 76 into the flaring portion of the stepped bore 72.

We claim:

1. A drill jog for enabling a production of predetermined specific drilled hole patterns in a workpiece, the drill jog comprising:

a hole index rail adapted to be placed on the workpiece to be machined, the hole index rail including a series of equidistantly spaced holes;

at least one angular stop adjustable transversely to the series of holes for setting a distance of the series of holes from an edge of the workpiece;

at least one lateral stop adjustable along a length of the hole index rail;

a slide carrying at least one drill bush adapted to be respectively aligned to one of the holes of the hole index rail and the lateral stop, wherein the slide and the lateral stop are each associated with a locking member engaging into a hole of the hole index rail, and at least one lateral stop carrier, wherein the lateral stop includes a stop section, said stop section further comprising means for adjusting said stop section stepwise in a longitudinal direction along said hole index rail, said lateral stop carrier including the locking member.

2. A drill jig according to claim 1, wherein a plurality of exchangeable drill bushes of differing internal diameters are associated with said slide.

3. A drill jig according to claim 1, wherein the drill jig includes at least two lateral stop carriers having stop sections adapted to be adjusted in a stepwise manner.

4. A drill jig according to claim 1, wherein said angular stop further comprises an angle section and an angle section carrier, and wherein the hole index rail includes means for guiding said angle section carrier such that said angle section carrier is longitudinally displaceably guided along the hole index rail, and wherein said angle section is adjustable at the angle section carrier in an infinitely variable fashion transversely of the series of the holes.

5. A drill jig according to claim 1, wherein the hole index rail includes a flat profile member having a substantially C-shaped groove opening toward a top side of the hole index rail for guiding the slide, and a further substantially C-shaped groove opening toward an underside of the hole index rail for guiding the lateral stop carrier and the angular stop carrier, and wherein the further substantially C-shaped groove is arranged offset with respect to the series of holes.

6. A drill jig according to claim 1, wherein the locking member includes a peg, and wherein a compression spring for biasing the peg is provided between an annular shoulder of a stepped bore and an annular shoulder of a bolt such that the locking member may be manually retracted against a bias of said compression spring into a flaring portion of the stepped bore so as to enable the peg to be unlocked by a handle.

7. A drill jig accordingly to claim 5, wherein the at least one drill bush subtends the slide with a base and carries, on an external thread located there above, a nut for fixedly clamping the slide to marginal legs of the substantially C-shaped groove of said flat profile member adjacent said opening thereof.

8. A drill jig according to claim 1, wherein the hole index rail includes a flat profile member having a substantially C-shaped groove with marginal legs and opening toward an underside of the hole index rail, and wherein the at least one lateral stop carrier includes a screw knob, and wherein the at least one lateral stop carrier further includes a transverse leg projecting beyond the series of holes, said transverse leg comprising a locking member including a cylindrical projection arranged on a main surface of the transverse leg facing the hole index rail, said transverse leg further comprising an oppositely disposed main surface carrying a guide groove for the stop section, and wherein the at least one lateral stop carrier is adapted to be clamped by the screw knob onto said marginal legs of said substantially C-shaped groove.

9. A drill jig according to claim 8, wherein a locking projection is arranged at the guide groove, a plurality of holes are arranged at the stop section for fixedly determining discrete lateral stop positions, and wherein the stop section is adapted to be separately fixedly clamped to the lateral stop carrier by a screw knob extending through a slotted hole provided in the stop section.

10. A drill jig according to claim 5, wherein the at least one angular stop includes an angle section having a leg portion adapted to contact the hole index rail, said angle section being provided with two parallel slotted holes extending transversely to the series of holes, one of said slotted holes being adapted to accommodate a screw knob for clamping the angle section to the angle section carrier and the other of said slotted holes being adapted to accommodate a screw knob for clamping the angular stop to legs of the angular stop carrier.

11. A drill jig for enabling production of predetermined specified drill hole patterns in a workpiece, the drill jig comprising a hole index rail adapted to be placed on the workpiece to be machined and including a series of equidistant holes, at least one angular stop adjustable transversely to the series of holes for setting a distance of the series of holes from an edge of the workpiece, at least one lateral stop adjustable along the hole index rail, a slide for carrying a drill bush adapted to be respectively aligned with one of the holes of the hole index rail and a lateral stop, said slide and said lateral stop being adapted to be guided along said hole index rail, wherein said slide and said lateral stop are each associated with a locking member adapted to engage into a hole of the hole index rail, and wherein the lateral stop includes a lateral stop carrier and a stop section, said stop section further comprising means for adjusting said stop section stepwise in a longitudinal direction along said hole index rail, said lateral stop carrier includes a locking member, and wherein the hole index rail includes a flat profile member having a substantially C-shaped groove opening toward a top side of the hole index rail for guiding the slide, and a further substantially C-shaped groove opening toward an underside of the hole index rail for guiding the lateral and angular stop carriers, said series of holes being formed in the bottom of the substantially C-shaped groove for guiding the slide and said further substantially C-shaped groove is arranged offset beside the series of holes.

* * * * *